United States Patent [19]

Mitchell

[11] Patent Number: 4,481,702

[45] Date of Patent: Nov. 13, 1984

[54] METHOD OF ASSEMBLING THREADED INSERT BUSHING WITHIN A WORKING MATERIAL

[75] Inventor: John D. Mitchell, Seattle, Wash.

[73] Assignee: The Boeing Company, Seattle, Wash.

[21] Appl. No.: 429,893

[22] Filed: Sep. 30, 1982

[51] Int. Cl.³ .......................................... B23P 11/00
[52] U.S. Cl. .................................. 29/432; 29/522 R; 29/526 R; 411/53; 411/58; 411/59; 403/297
[58] Field of Search ................... 29/432, 523, 526 R, 29/522 R; 411/49, 53, 57, 58, 59, 177; 403/297, 292

[56] References Cited

U.S. PATENT DOCUMENTS

| | | | |
|---|---|---|---|
| 685,821 | 11/1901 | Cook | 411/57 |
| 859,532 | 7/1907 | Swortfiger | 411/49 |
| 927,064 | 7/1909 | Mower | 411/57 |
| 1,033,447 | 7/1912 | Mower | 411/57 |
| 1,034,607 | 8/1912 | Frank et al. | 411/57 |
| 1,035,277 | 8/1912 | Veres | 411/53 |
| 1,053,682 | 2/1913 | Antwerp | 411/57 |
| 1,108,656 | 8/1914 | Adler | 411/53 |
| 1,224,720 | 5/1917 | Di Salvo | 411/53 |
| 1,434,394 | 11/1922 | Matthes | 411/53 |
| 1,469,668 | 10/1923 | Karitzky | 411/57 |
| 1,470,858 | 10/1923 | Maxwell | 411/57 X |
| 1,603,292 | 10/1926 | Peirce | 411/49 |
| 2,525,703 | 10/1950 | McGirr | 403/297 X |
| 2,625,071 | 1/1953 | Lewis | 411/53 |
| 2,647,431 | 8/1953 | Lewis | 411/53 |
| 3,352,191 | 11/1967 | Crawford | 403/292 X |
| 3,954,345 | 5/1976 | Morris | 403/297 |
| 3,986,429 | 10/1976 | Busler | 403/297 X |
| 4,147,444 | 4/1979 | Herb et al. | 403/297 X |
| 4,152,086 | 5/1979 | Achenbach et al. | 403/297 X |
| 4,236,848 | 12/1980 | Rock et al. | 403/297 X |
| 4,278,006 | 7/1981 | Lobello | 411/57 X |

FOREIGN PATENT DOCUMENTS 682562 11/1952 United Kingdom .................. 411/53

*Primary Examiner*—Charlie T. Moon
*Attorney, Agent, or Firm*—James P. Hamley; Bernard A. Donahue

[57] ABSTRACT

An insert assembly includes a frustoconically shape cone nut (10), a cylindrical shell (20) and a bolt (36). The cone nut (10) has a longitudinal bore (12) which is tapped to accept the threads on the bolt. The shell (20) has projecting barbs (28) arranged in a helical pattern on the shell's outer surface. The assembly, comprising the bolt through the shell and threaded into the smaller diameter end of the nut cone, is driven into a bore in the work piece. The bolt is then rotated causing the cone nut to penetrate the shell resulting in radial expansion of the shell whereby the barbs become embedded in the work piece. A keying feature between the nut and the shell prevents nut rotation with the bolt.

6 Claims, 11 Drawing Figures

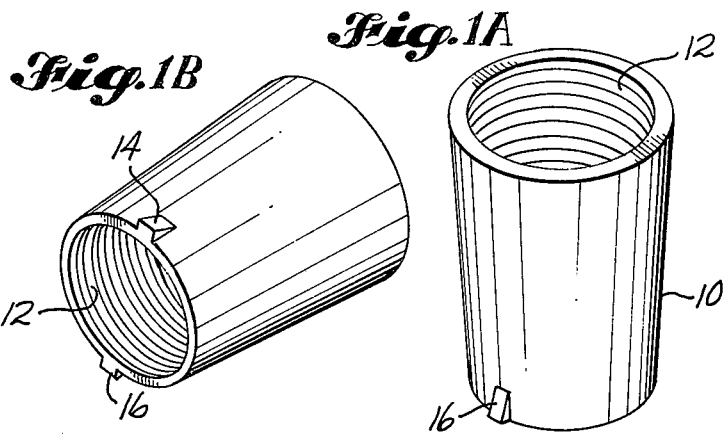
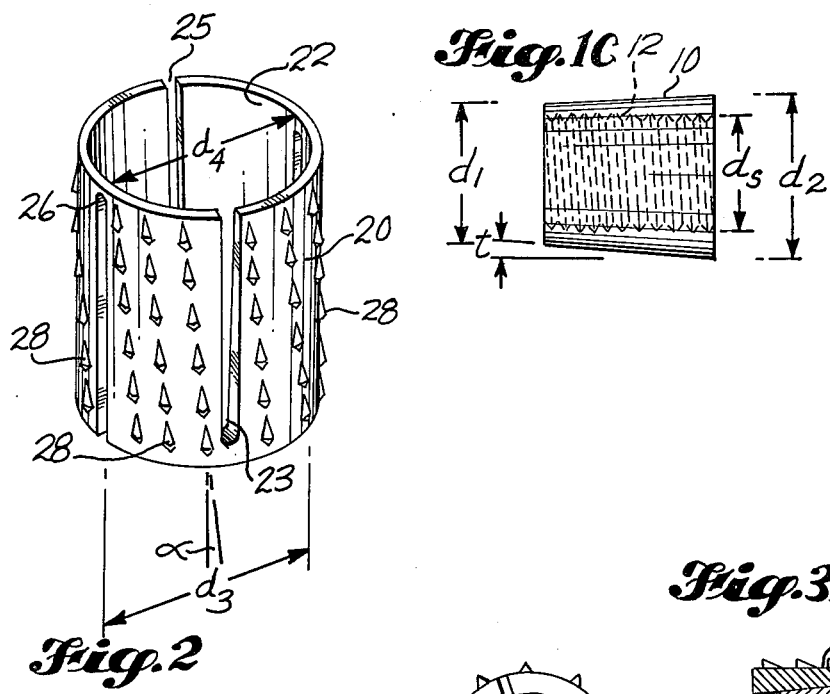
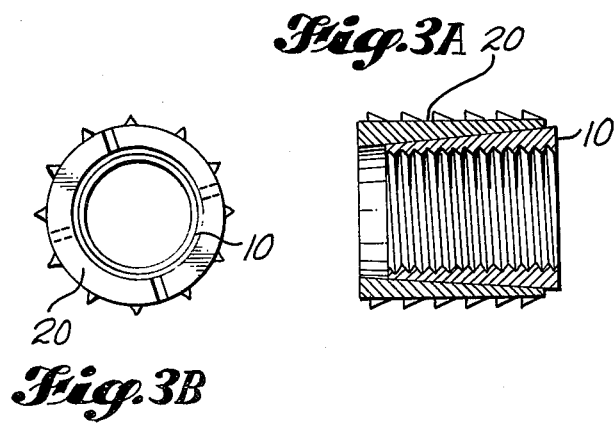

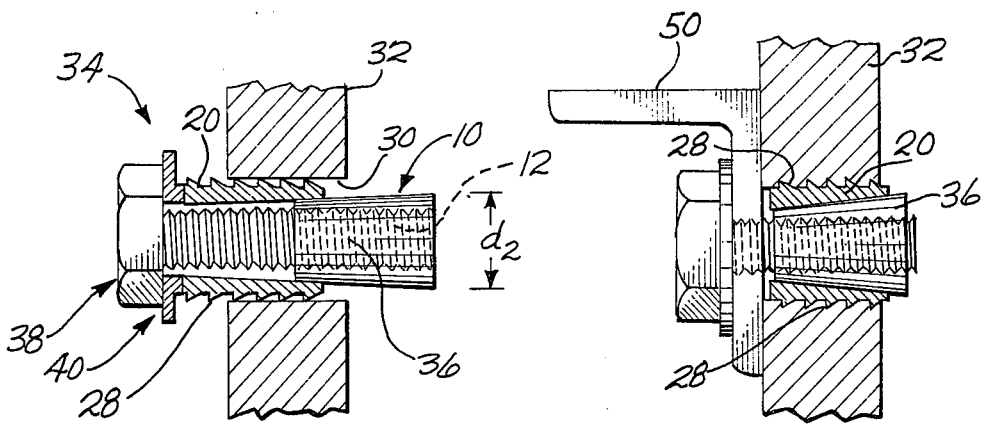
*Fig.4*  *Fig.5*
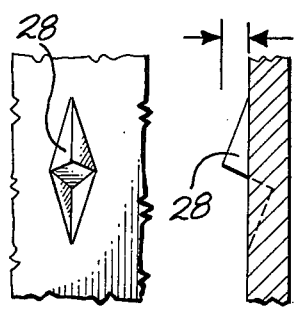
*Fig.6*
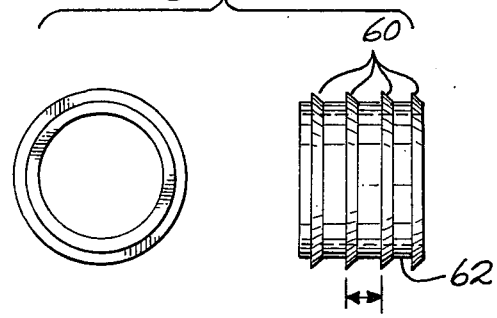
*Fig.7A*
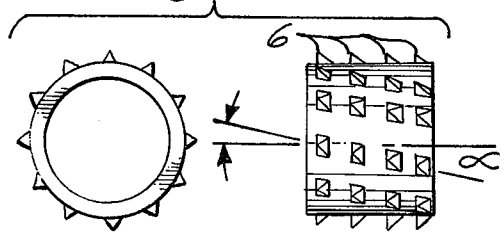
*Fig.7B*

METHOD OF ASSEMBLING THREADED INSERT BUSHING WITHIN A WORKING MATERIAL

BACKGROUND OF THE INVENTION

The present invention pertains to the construction art and, more particularly, to apparatus for, and a method of providing a threaded insert in a work piece.

Applications commonly exist in mechanical construction for providing threaded inserts within a base structure. Where the base structure is relatively soft, such as mild steel, aluminum, phenolic laminates or fiber-reinforced plastics, merely drilling a hole and then tapping does not produce satisfactory results. In addition, where threaded inserts are to be provided in a soft base material it is important that the insert be installed without any driving forces, as by hammering, which may tend to shock or deform the structure during installation.

In addition, particularly where the insert is to be placed in a soft base material, it is important that the means for retaining the insert in the base material not allow the insert to work its way loose from the material in use.

Additional desirable features of such an insert are that:
(1) it be installable from the face side of the base material;
(2) no special tools or bolts be required;
(3) its holding power in the base material increase linearly with applied force;
(4) it be simple and low cost to manufacture; and
(5) it be simple and easy to install.

The prior art has developed numerous devices which are intended for use as threaded inserts. These commonly take the form of expansion bolts wherein an assembly, including a bolt, is driven into a hole provided in the working material. Rotation of the bolt causes the assembly to expand into and grip the working material, thereby forming the threaded insert. None of such assemblies known to the prior art provide the various features detailed above. In particular, none of the prior art insert assemblies has proved itself to be well suited for insertion into soft base or working materials.

SUMMARY OF THE INVENTION

It is an object of this invention, therefore, to provide a threaded insert which provides all of the above desired features.

It is a particular object of the invention to provide a threaded insert which is suited for application in soft working materials.

Briefly, according to the invention, a threaded insert bushing includes a frustoconically shaped cone nut having a first diameter $d_1$ at one end and a second diameter $d_2$ at the other end, where $d_1 < d_2$. The cone nut is provided with a threaded, longitudinal bore. A cylindrically shaped shell has a longitudinal bore of diameter $d_s$, where $d_1 < d_s < d_2$; thus, the bore of the shell is adapted to receive the first diameter $d_1$ of the cone nut. Upon penetration of the cone nut into the shell, the shell is radially expandable, and its outer surface is provided with a series of helically aligned barbs with respect to the longitudinal axis of the shell. The cone nut and shell have interconnecting keying means such that with the cone nut received within the shell, the cone nut is prevented from rotation relative to the shell.

BRIEF DESCRIPTION OF THE DRAWINGS

FIGS. 1A, 1B and 1C are views of the preferred cone nut;

FIG. 2 is a perspective view of the preferred knurled outer shell;

FIGS. 3A and 3B are cross-sectional, and end views, respectively, illustrating the mating relationship between the cone nut and the outer shell;

FIGS. 4 and 5 are cross-sectional views illustrating the installation of the insert bushing assembly;

FIG. 6 illustrates forming the knurled portion on the outer shell by use of a diamond-shaped knurling tool; and FIGS. 7A and 7B illustrate an alternate, broaching method for forming the knurls.

DETAILED DESCRIPTION OF THE PREFERRED EMBODIMENT OF THE INVENTION

FIGS. 1A, 1B and 1C illustrate various views of a frustoconically shaped cone nut 10. The cone nut has a first diameter $d_1$ at one end, and a greater diameter $d_2$ at its other end. The taper of the frustoconical section is, in this, the preferred embodiment of the invention, 4°30'. In addition, it is provided with a longitudinal, threaded bore 12. Diametrically opposed lugs 14, 16 extend radially out of the first diameter end of the cone nut 10. These lugs 14, 16 provide an interconnecting keying means with the shell, as is discussed hereinbelow. In this, the preferred embodiment of the invention, the cone nut 10 is formed of metal, preferably SAE 2330 or equivalent.

FIG. 2 is a perspective view of a knurled outer shell 20. The shell 20 is cylindrically shaped and is provided with a longitudinal, conical bore, 22, of taper matching that of the cone nut 10 and having a small diameter $d_3$ and a large diameter $d_4$ such that $d_3 < d_1$, and $d_1 < d_4 < d_2$. Thus, the central bore 12 of the shell is adapted to receive the first diameter end of the cone nut 10.

A series of diametrically opposed slits 23–26 extend over a substantial portion of the length of the shell 20. These slits serve two purposes. First, they are arranged to mate, or key with the lugs 14, 16 of the cone nut 10 when the cone nut is received within the shell 20. This creates a keying action between the lugs and the slits, thereby preventing rotation of the cone nut relative to the shell.

In addition, the shell 20 is preferably made of hardened steel, such as SAE 4340. This material is not particularly malleable and, thus, the slits 23–26 provide a means for the shell 20 to radially expand upon penetration of the cone nut 10 into the bore 22 upon insertion of the assembly, as is shown more clearly in FIGS. 4 and 5.

The outer surface of shell 20 is provided with a series of barbs, one of which is indicated at 28. These barbs are configured to penetrate the working surface into which the insert is placed, thereby preventing withdrawal from the surface. A particularly unique feature of the shell 20 is that the barbs are helically aligned with respect to the longitudinal axis of the shell. That is, there is an angle $\alpha$ between a column of barbs and the longitudinal axis of the shell 20, such that $$\tan \alpha = \frac{\text{pitch spacing of barbs}}{\text{shell length}}.$$

By helically aligning the barbs, when the insert assembly is affixed in a soft material, with subsequent forces applied to the assembly attempting to pull it out of the material, each barb must cut its own exit path. In such inserts known to the prior art, the configuration was such that the leading edge retaining means, barb or otherwise, when pulled through the working surface material, created a path that the remaining retaining surfaces could simply follow, thereby resulting in failure of the assembly. Such pull-out type failures are made much more difficult by the helical alignment of the barbs.

FIGS. 3A and 3B are cutaway side views, and end views, respectively, showing the mating relationship between the cone nut 10 and the outer shell 20 in the assembled form.

FIGS. 4 and 5 illustrate the method by which the insert assembly is inserted in a working material. First, a bore 30 is provided in the working material 32. This bore is of a slightly greater diameter than the diameter $d_2$ of the cone nut 10 and slightly smaller than the outer diameter of the shell 20 (sized for a "light-drive" fit with shell 20). The insert assembly, indicated generally at 34, is comprised of a common bolt 36 having a head 38 and a special stepped or shouldered washer 40. The bolt is inserted through the shell 20, whose barbs, such as 28, are arranged for maximum holding power in the working material, and then threaded into the threaded bore 12 of the smaller diameter end of the cone nut 10.

The assembly 34 is inserted (lightly driven) until the washer 40 abuts the front surface of the working material 32. The stepped shoulder of the washer ensures that shell 20 is inserted below the bolt-up surface of the working material 32. At that point, the bolt 36 is tightened, thereby drawing the cone nut 10 into the shell 20. This, as shown in FIG. 5, causes radial expansion of the shell 20 whereby the barbs, such as barb 28, are caused to embed into the working material 32. It should be noted that the holding force of the outer shell 20 in the working material 32 is linearly related to the rotation of the bolt 36, thereby providing a precise means to control the penetration of the barbs into the working material and, thereby, determine the holding force of the assembly.

As shown in FIG. 5, once the threaded insert is in place, the bolt may be removed and another working piece, such as bracket 50, may be put in place, thereafter to be secured by the bolt in the threaded bushing.

FIG. 6 indicates one method for forming the knurls, such as knurl 28, in the cone 20 of FIG 2. This knurl is formed by applying a diamond-shaped knurling tool to the outer surface of the shell at the desired location of each barb.

FIGS. 7A and 7B illustrate an alternate method for providing the barbs, in the helical alignment, on the outer surface of the shell. Here, a series of circumferential rings 60 are roll formed or turned on the outer surface of a shell 62. Portions of the rings 60 are then broached, at the angle α which determines the helical alignment of the barbs with respect to the longitudinal axis of the shell. This results in an extremely cost effective method for forming the helically aligned barbs.

In summary, apparatus for, and the method of providing a threaded insert bushing has been described in detail.

While a detailed description of the invention has been described, many modifications and variations thereto are possible, all of which fall within the true spirit and scope of the invention.

I claim:

1. A method for forming a threaded insert within a working material comprising the steps of:
   (a) providing a frustoconically shaped cone nut having a first diameter $d_1$ at one end and a second diameter $d_2$ at the other end, where $d_1 < d_2$, the cone nut being provided with a threaded, longitudinal bore;
   (b) providing a cylindrically shaped shell, the shell being provided with a longitudinal bore of diameter $d_s$, where $d_1 < d_s < d_2$, such that the shell is adapted to receive said first diameter $d_1$ of the cone nut, the shell being radially expandable upon penetration of the cone nut, and the outer surface of the shell being provided with a series of barbs helically aligned with respect to the longitudinal axis of the shell;
   (c) providing a keying means between the cone nut and the shell such that the cone nut is prevented from rotation relative to the shell when the cone nut is received therein;
   (d) providing a predetermined diameter bore within the working material, said predetermined diameter being slightly smaller than the outer diameter of the shell;
   (e) inserting a bolt through the shell bore and into the cone nut at the first diameter end, the threads on the bolt mating with the threads provided in the cone nut, thereby forming an assembly;
   (f) inserting said assembly, second diameter end of the cone nut first, into the provided bore of the working material; and
   (g) tightening said bolt such that said cone nut is pulled into the shell thereby radially expanding the shell and causing said barbs to embed in the working material.

2. The method of claim 1 wherein step (c) comprises the steps of:
   (i) providing diametrically opposed lugs which extend radially out of the first diameter end of the cone nut; and
   (ii) providing diametrically opposed slits extending along a substantial portion of the length of the shell, said slits being adapted for receiving and mating with said lugs upon the shell receiving the cone such that the lugs form an interference fit with the slits, thereby preventing relative rotation of the cone nut with respect to the shell.

3. The method of claim 2 wherein:
   step (b) comprises providing a cylindrically shaped shell of hardened metal; and
   step (c) (ii) comprises providing said slits such that the slits permit said radial expansion of the shell.

4. The method of any one of claims 1 through 3 wherein step (b) further comprises the step of:
   forming said helically aligned barbs by applying a diamond shaped knurled tool to the shell outer surface at each location of a desired barb.

5. The method of any one of claims 1 through 3 wherein step (b) further comprises the steps of:
   forming said helically aligned barbs by:
   (i) forming a series of circumferential rings around the outer radius of the shell; and
   (ii) broaching portions of said rings in a helical alignment with respect to the longitudinal axis of the shell.

6. The method of claim 1 wherein step (b) further comprises the step of providing said shell longitudinal bore as conical with a pitch for mating with the pitch of the cone, having a small diameter $d_3$ at one end and a large diameter $d_4$ at the other end, where $d_3 < d_1$ and $d_1 < d_4 < d_2$.

* * * * *